United States Patent Office 3,542,692
Patented Nov. 24, 1970

3,542,692
LIQUID MIXTURE OF N-4-METHYL-2-PENTYL-N'-PHENYL-PARA-PHENYLENEDIAMINE AND N-5 - METHYL - 2 - HEXYL - N' - PHENYL - PARA-PHENYLENEDIAMINE
Ronald B. Spacht, Hudson, Ohio, assignor to The Goodyear Tire & Rubber Company, Akron, Ohio, a corporation of Ohio
No Drawing. Filed May 8, 1968, Ser. No. 727,660
Int. Cl. C08f 45/60
U.S. Cl. 252—401
4 Claims

ABSTRACT OF THE DISCLOSURE

Liquid N-sec-alkyl-N'-phenyl-para - phenylenediamine age resister system for polymers.

This invention relates to a liquid N - alkyl - N'-phenyl-para-phenylenediamine age resister system for polymers. Many polymers, both vulcanized and unvulcanized, are subject to degradation by oxygen. Many vulcanized polymers are subject to degradation by ozone. Degradation by oxygen can take the form of chain scission as well as crosslinking of the polymers. Such degradation can result in polymers which are very difficult to process, and which possess inferior physical properties, such as reduced tinsile and flexibility. Ozone attack will often result in cracking of the vulcanized polymer, particularly when the vulcanized polymer is subjected to dynamic conditions. For example, polymers in the sidewalls of a pneumatic tire are very susceptible to ozone cracking. In order to prevent the degradation of vulcanized and unvulcanized polymers it has been necessary in the past to incorporate various antioxidant as well as antiozonant compounds into the polymer environment. In many applications it is desirable that the age resister be in liquid form at room temperature. For example, where it is desired that the age resister be added to a latex it is preferable that the age resister be a liquid so that it may be added to the latex in the form of an emulsion. Some of the amine type antioxidants and antiozonants used commercially are solids at room temperature. Others are semi-solids or liquids at room temperature. Those which are solids at room temperature normally must be added to polymers by mechanical mixing on a mill or in an internal mixer such as a Banbury mixer. To facilitate ease of incorporation of the age resister into the polymer and to facilitate ease of handling it is desirable that the solid age resister be pulverized in flake form. However, if the solid age resister is low melting it tends to cake or lump during shipping and storage when temperatures approach its melting point. The higher temperatures cause the age resister to partially or wholly melt. When the temperature returns to a normal level the low melting age resister turns to a lumpy or caked mass which is difficult to handle. Liquid age resisters present no such problem. Age resisters which are semi-solids at room temperature are difficult to handle commercially and require time consuming and sometimes expensive heating to liquefy them. Liquid age resisters are therefore much easier to handle than semi-solid age resisters. Some liquid age resister systems tend to solidify at temperatures only slightly below room temperature. They therefore sometimes require expensive heating during storage and shipping. Otherwise it sometimes is necessary to "thaw out" the systems before usage.

N-4-methyl - 2 - pentyl - N'-phenyl-para-phenylenediamine (MPD) and N - 5-methyl-2-hexyl-N'-phenyl-para-phenylenediamine (MHD) are potent age resisters known to possess excellent antioxidant/antiozonant properties and low volatility. However, depending on their degree of purity, MPD and MHD are either semi-solids or low melting solids. In 100% pure form they have melting points of 50° C. to 52° C. and 34° C. to 35° C. respectively. If semi-solid they are difficult to handle. If solid they possess the disadvantages of such systems as described earlier herein. It would be desirable to obtain liquid forms of MPD and MHD without substantially reducing their age resister (antioxidant/antiozonant) activity or increasing their low volatility.

It is an object of this invention to provide an antioxidant/antiozonant age resister system which is liquid at room temperature, remains in liquid form even at temperatures below room temperature or, if in solid form at temperatures below room temperature, capable of returning essentially completely to the liquid state at room temperature. A still further object is to provide both N-4-methyl - 2 - pentyl - N' - phenyl-para-phenylenediamine, and N - 5 - methyl - 2 -hexyl-N'-phenyl-para-phenylenediamine in liquid form.

The objects of the present invention are accomplished by the preparation of an age resister mixture comprising (A) from about 15 to about 65 parts by weight of N-4-methyl - 2 - pentyl - N'-phenyl-para-phenylenediamine (MPD) and (B) from about 35 to about 85 parts by weight of N - 5 - methyl - 2-hexyl-N'-phenyl-para-phenylenediamine (MHD), wherein the sum of (A) and (B) is 100 parts by weight. The mixture is normally essentially completely liquid at room temperature. Where it is desirable that the age resister system not only be liquid at room temperature but in addition be liquid at lower temperatures and/or after solidifying at lower temperatures, be able to liquefy on returning the system to room temperatures, MPD/MHD weight ratios of from about 45/55 to about 15/85 are preferred with a ratio of from about 35/65 to about 15/85 being most preferred. An effective and relatively inexpensive MPD/MHD weight ratio is from about 55/45 to about 45/55.

The age resister system of the present invention provides the user with an easy to handle liquid system which retains the potency and low volatility of its components. Being liquid allows it to be readily emulsified for addition to polymer latices, using the well known emulsification techniques. As a result of the present invention MPD and MHD can be used in liquid form without sacrificing their activity as antioxidants and antiozonants.

By the term "room temperature" herein is meant a temperature of approximately 72° F.

The age resister system of the present invention may be prepared in a variety of ways, the manner of preparation normally not being critical. An adequate method of combining the components comprises heating the components separately until both are liquids, combining the liquids to form a homogeneous blend and cooling the combination to room temperature. Another method involves combining the materials, heating the combination until the combination is completely liquid and then cooling the combination to room temperature. Still another method invloves dissolving the components separately in solvents, combining the solutions and removing the solvent. The system can also be formed by dissolving both components together in a solvent and removing the solvent.

The MPD and MHD can be prepared by various methods. For example, MPD can be prepared by reacting 4 - methyl - 2 - pentanone with para-aminodiphenylamine in the presence of hydrogen and a reductive alkylation catalyst such as nickel. MHD can be prepared in the same manner with the exception that 5-methyl-2-hexanone is substituted for 4-methyl-2-pentanone. Such a method is described in U.S. Pat. 3,366,684.

The age resister system in accordance with the present invention is effective in stabilizing both unvulcanized and vulcanized polymers against oxygen attack and vulcanized polymers against ozone attack. The precise amount of the disclosed age resister system which is to be employed will depend somewhat upon the nature of the polymer, the severity of deteriorating conditions to which the polymer is to be exposed and whether primarily antioxidant or antiozonant protection is desired. If used primarily as an antioxidant, levels of about 0.05 to about 10.0 parts by weight per 100 parts by weight of polymer can be used. Preferably a range of 0.25 to 0.75 part is used. If used primarily as an antiozonant, levels of about 1.0 to about 10.0 parts by weight per 100 parts by weight of polymer are effective. A preferred antiozonant level is from about 2.0 parts to about 5.0 parts by weight per 100 parts by weight of polymer.

The polymers that may be conveniently protected by the compounds of this invention in accordance with this invention are vulcanized and unvulcanized polymers susceptible to oxygen degradation and vulcanized polymers subject to ozone degradation, such as natural rubber, balata, gutta percha and rubbery synthetic polymers containing carbon to carbon double bonds. Representative examples of the synthetic polymers used in the practice of this invention are polychloroprene; homopolymers of a conjugated 1,3-diene such as isoprene and butadiene, and in particular, polyisoprenes and polybutadienes having essentially all of their repeat units combined in a cis-1,4 structure; copolymers of a conjugated 1,3-diene such as isoprene and butadiene with up to 50% by weight of at least one copolymerizable monomer such as styrene and acrylonitrile; butyl rubber, which is a polymerization product of a major proportion of a monoolefin and a minor proportion of a multiolefin such as butadiene or isoprene; polyurethanes containing carbon to carbon double bonds; and copolymers of monoolefins containing unsaturation, i.e., carbon to carbon double bonds, such as terpolymers of ethylene, propylene and a nonconjugated diene.

The manner of adding the products of the present invention to the polymers is not normally critical. The products may be added to the polymer while the polymer is in latex or emulsion form, suspension form, dispersion form or solution form. They may also be added to dry polymer, if desired, using any of the conventional dry mixing means such as an open mill, an extruder or an internal mixer such as a Banbury mixer.

Where it is desired to protect unvulcanized polymer against oxygen degradation, the liquid age resister system is added prior to exposure to such degradation conditions. For example, due to its liquid form it can be easily emulsified using standard emulsification techniques and added to an SBR latex so as to protect the SBR polymer during conventional finishing steps such as the high temperature drying of the coagulated polymer. Where it is desired to make use of the antiozonant protection offered by the age resister system of the subject invention, the noncaking and easy to handle system can be added to the dry rubber during compounding steps prior to vulcanization. Where both types of protection are desired, an antiozonant amount can be added to the unfinished polymer. Alternatively, an antioxidant amount can be added to the unfinished polymer and an additional amount added to the finished polymer during compounding to raise the level to an antiozonant amount.

These procedures are not limiting as to the use of the age resister system. Due to its versatility as an antioxidant and antiozonant and its physical form the age resister system can be used in a variety of ways known to those skilled in the art.

The practice of this invention is further illustrated by means of the following examples which are not intended to be limitations on the scope of the invention.

EXAMPLES 1 TO 12

The following Examples 1 through 12 illustrate the preparation of liquid age resister systems within the scope of the present invention. Various mixtures of N-4-methyl-2 - pentyl - N' - phenyl-para-phenylenediamine (approximately 95% pure) and N-5-methyl-2-hexyl-N'-phenyl-para-phenylenediamine (approximately 95% pure) were prepared by combining the components at room temperature in aluminum weighing dishes, covering the dishes, heating the combinations to 200° F. and allowing the liquid mixtures to cool to room temperature overnight. The mixtures each weighed approximately 15 grams. After cooling to room temperature all samples were seeded with very small amounts of crystals of either N-4-methyl-2-pentyl-N'-phenyl-para-phenylenediamine (MPD) or N-5-methyl-2-hexyl-N'-phenyl-para-phenylenediamine (MHD) and stirred approximately once each day for two weeks. The MPD was added to Examples 1 to 7 and the MHD was added to Examples 7 to 12. The purpose of seeding the mixtures was to accelerate any possible crystallization of either or both of the components of the mixtures. Examples 5 to 10 are systems within the scope of the present invention, while Examples 1 to 4, 11 and 12 are systems outside the scope of the present invention. Their physical appearance after two weeks was noted. The results are listed in the following Table I.

TABLE I

| Example: | Weight percent MPD/weight percent MHD | Physical state |
| --- | --- | --- |
| 1 | 100/0 | Hard solid. |
| 2 | 90/10 | Do. |
| 3 | 80/20 | Soft solid. |
| 4 | 70/30 | Very soft solid. |
| 5 | 65/35 | Soft solid liquid paste. |
| 6 | 60/40 | Liquid. |
| 7 | 50/50 | Do. |
| 8 | 40/60 | Do. |
| 9 | 30/70 | Do. |
| 10 | 20/80 | Do. |
| 11 | 10/90 | Soft solid. |
| 12 | 0/100 | Hard solid. |

1 After 2 weeks at room temperature (about 72° F.).

The above data indicate that age resister systems which are liquid at room temperature may be obtained by combining certain components in certain specific ratios even though the components themselves are not liquid at room temperature.

The following Examples 13 to 17 are again illustrative of the preparation of age resister systems of the present invention. They also illustrate various embodiments of the present invention wherein the age resister system not only is a liquid at room temperature, but in addition will essentially completely reliquefy at room temperature after being wholly or partially solidified at temperatures below room temperature.

EXAMPLES 13 to 17

Various mixtures within the scope of the present invention were prepared. The components used were approximately 95% pure MHD and approximately 97.5% pure MPD. Mixtures of these components were melted on a hot plate and placed in small tightly closed metal containers. The containers were placed in a refrigerator in which the temperature averaged from about 2° C. to 3° C. After 1, 2, 4, 7 and 9 days the containers were opened and the contents examined. After the first day all the mixtures which contained no solid were seeded with a very small amount of MPD. After the second day all mixtures which contained no solid were seeded with a very small amount of MHD. The mixtures were seeded in order to accelerate any crystallization which might occur. After the ninth day at 2° C. to 3° C., the samples were returned to room temperature and allowed to stand at room temperature for two weeks. Their condition after two weeks was observed and recorded. The results are listed in Table II.

TABLE II

| Example | Weight percent MPD/weight percent MHD | First solid days | Complete solid, days | Physical state |
|---|---|---|---|---|
| 13 | 60/40 | 1 | 4 | Remained solid. |
| 14 | 50/50 | 4 | 9 | Sticky, partially solid. |
| 15 | 40/60 | 4 | 9 | Pasty, few crystals. |
| 16 | 30/70 | 4 | 7 | Liquefied. |
| 17 | 20/80 | 4 | 4 | Do. |

[1] After 2 weeks at room temperature.

The above data (Examples 15, 16 and 17) demonstrate that specific ratios of specific components will result in an age resistor system which can be subjected to very low temperatures and yet on returning to room temperature will return essentially completely to liquid form.

EXAMPLES 18 AND 19

Two carbon black loaded rubbery compositions were prepared using the following recipe.

| Components: | Weight (grams) |
|---|---|
| SBR 1712 [1] | 852.5 |
| SBR 1500 [2] | 200.0 |
| Whole tire reclaim [3] | 500.0 |
| Zinc oxide | 30.0 |
| Stearic acid | 10.0 |
| FEF carbon black | 450.0 |
| SRF carbon black | 150.0 |
| Modified asphaltic plasticizer (Paraflux) | 50.0 |
| Blended microcrystalline/paraffinic wax (Sunolite 250) | 30.0 |
| Age resister [4] | 25.0 |
| Sulfur | 17.0 |
| (90/10) N-oxydiethylene benzothiazole 2-sulfenamide/benzothiazyl disulfide | 13.0 |
| Diphenyl guanidine | 2.0 |

[1] An oil extended, BLE stabilized, butadiene/styrene elastomer.
[2] A butadiene/styrene elastomer.
[3] A reclaim composition having a rubber hydrocarbon content of 35% and containing oils, resinous type materials and loading compounds such as carbon black.
[4] In Example 18 the age resister was MPD and in Example 19 the age resister was a 50/50 mixture of MPD and MHD.

All of the components with the exception of the curatives, i.e., the sulfur, 90/10 sulfenamide/benzothiazyl disulfide mixture and the diphenyl guanidine were mixed in a 00 lab Banbury at 65 r.p.m. The batch was removed from the Banbury, sheeted out on a laboratory mill and set aside to cool. A portion of the rubber was then removed from the Banbury and milled with the curatives. The curative containing portion was then returned to the Banbury with the entire batch and mixed for two minutes. The 50/50 age resister mixture used in Example 19 was prepared by adding the MPD and MHD to a container, heating the contents to 70° C. to allow the materials to liquefy, agitating the mixture while still at 70° C. and then returning the mixture to room temperature. The stocks were vulcanized for 20 minutes at 305° F.

The kinetic ozone tests were carried out on 6 x ½ x 0.075 inch test samples cut from a vulcanized sheet of the rubbery composition. The samples were placed in metal holders and intermittently extended to about 110% of their original length at a frequency of about 30 cycles per minute in an O.R.E.C., Model 0300 ozone chamber. They were placed in an atmosphere possessing an ozone concentration of 20 parts per hundred million by volume at a temperature of 100° F. for a period of 90 hours. The concentration was monitored with a Mast Development Corporation continuous ozone analyzer, Model 724-2. The samples were then visually evaluated for crack formation and rated according to the rating system disclosed by J. C. Ambelang and B. W. Habeck in "Rubber World" 141, 86 (1959). The data are listed in Table III. Some of the test samples were subjected to heat aging in a forced air oven prior to testing.

Kinetic sun check data was also gathered on the same rubbery compositions. The kinetic sun checking tests were carried out on samples 6 inches in length and 0.075 inch thick. The samples had a V taper width of 1.1 inches at one end and 0.5 inch at the other. The wide end possessed two holes while the narrow end possessed one hole. The holes allowed the samples to be fastened in the appropriate testing apparatus.

The ends of the kinetic sun checking samples were placed in metal holders and intermittently extended 115% of their original length at a frequency of 60 cycles per minute. This assembly was weathered outdoors for 16 days. After the weather testing was completed the kinetic sun checking samples were visually evaluated for crack formation and rated according to the rating system disclosed by J. C. Ambelang and B. W. Habeck in "Rubber World" 141 86 (1959). The data are listed in Table III. Some of the test samples were subjected to heat aging in a forced air oven prior to aging.

TABLE III

| | Examples | |
|---|---|---|
| | 18 | 19 |
| Age resister system (parts) | [1] 2.50 | [2] 2.50(50/50) |
| Kinetic ozone: | | |
| Original | 4/2-5 | 4/2-6 |
| Aged [3] 7 days at 158° F | 3-4/2-7 | 3-4/2-7 |
| Aged [3] 10 days at 158° F | 4(−)/2-6 | 4(−)/2-5 |
| Kinetic Sun Checking: | | |
| Original | [4] 4/3-5 | 3(+)/1-4 |
| Aged [3]: | | |
| 3 days at 158° F | 3(+)/1-3 | 3-4/½-3 |
| 7 days at 158° F | 3(+)/½-4 | 3-4/½-4 |
| 10 days at 158° F | 3/1-3 | 4(−)/1-3 |
| 24 hours at 212° F | 3(+)/½-3 | 3/½-2 |
| 48 hours at 212° F | 4/2-4 | 4/1-5 |

[1] MPD.
[2] MPD/MHD.
[3] Indicates treatment in a forced air oven prior to testing. These data demonstrate that the age resister system of the present invention (Example 19) was equivalent to one of its components (Example 18), which is a well known antioxidant/antiozonant.
[4] These data are based on the visual crack formation rating system disclosed by J. C. Ambelang and B. W. Habeck in "Rubber World" 141 86 (1959). The numerator value is a rating given the test samples based on the density of the cracks formed during the ozone testing. As the number of cracks increase the numerator value increases. The denominator value is a rating based on the size of the cracks. This value increases as the crack size increases. A rating of 4/10 is the poorest rating under this rating system, while a rating of 0/0 is the best possible rating.

These data demonstrate that the age resister system of the present invention (Example 19) was equivalent to one of its components (Example 18), which is a well known antioxidant/antiozonant.

EXAMPLES 20 TO 23

The ability of the age resister system of the present invention to protect rubber against ozone degradation was evaluated by conducting dilute solution viscosity (DSV) tests using natural rubber (pale crepe) as the base rubber in which to evaluate the various inhibitors. In this test the retention of viscosity of a solvent solution of the rubber upon exposure to a mixture of oxygen and ozone which is bubbled through the solution is taken as a measure of antiozonant efficiency. The DSV tests were carried out in accordance with the general procedure outlined in the article by Delman, Simms & Allison (Analytical Chemistry, vol. 26, pages 1589–1592 (1954). Essentially this procedure comprises preparing a masterbatch solution of 0.8 gram of the base rubber in 100 milliliters of an organic solvent such as carbon tetrachloride, dichlorobenzene, toluene, etc . In Examples 20 to 21 benzene was used as the solvent. Portions of the masterbatch solution are then diluted with additional benzene to obtain solutions containing 0.2 gram of rubber per 100 milliliters of solution. The inhibitors to be evaluated for antiozonant efficiency are introduced to separate portions of the above described dilute solution in the amount of four parts per 100 parts of rubber. A stream of oxygen containing ozone is then passed through the dilute solutions and their viscosity determined at selected intervals using a Cannon-Fenski-Ostwald type viscometer.

The antiozonant efficiency of the inhibitors is calculated by employing the following equation:

$$\text{Antiozonant efficiency percent} = \frac{100(B-A)}{(C-A)}$$

where

A = DSV of additive free control after ozonolysis.
B = DSV of additive containing solution after ozonolysis.
C = initial DSV of additive free control before ozonolysis.

Results are then converted to a common basis (to allow for sporadic variations in crepe rubber compositions or in experimental conditions) by relating the antiozonant efficiency of an inhibitor to that of a standard inhibitor.

In Example 20 a well known commercially available antioxidant/antiozonant which is a mixture of diaryl-p-phenylenediamines was used. In Example 21 MPD of about 90 to 95% purity was used. MHD of approximately 95% purity was used in Example 22. In Example 23 the MPD and MHD were combined to form a 50/50 mixture. The mixture was prepared by placing 4 grams of MPD and 4 grams of MHD in a small vial, heating the mixture to melt the components, shaking the molten mixture vigorously and cooling the mixture to room temperature.

| | Age resister | Antiozonant efficiency |
|---|---|---|
| Test: | | |
| 20 | Control [1] | 100.0 |
| 21 | MPD | 172.0 |
| 22 | MHD | 169.1 |
| 23 | 50/50 MPD/MHD | 163.7 |

[1] A well known commercially available antioxidant/antiozonant which is a mixture of diaryl-p-phenylenediamines.

The above results demonstrate that an age resister system of the present invention, Example 23, offered effective antiozonant protection.

EXAMPLES 24 TO 27

To a pentane cement of a cis-1,4-polybutadiene elastomer possessing a cis-1,4 content in excess of 90% is added 0.50 part per 100 parts by weight of the polymer four stabilizers, a commercial mixture of substituted diaryl-para-phenylenediamines, MHD, MPD and a 50/50 mixture of MHD and MPD, the 50/50 mixture being prepared according to the method described in Examples 1 to 12. The stabilizers are added to the polybutadiene cement in the form of a benzene solution. The cements so formed are poured onto aluminum foil so as to form a thin film. After drying the weight of rubber is obtained in connection with each sample. Thereafter the foil with the adhering rubber strip is placed in an oxygen absorption apparatus. The amount of oxygen absorbed in a particular interval of time is determined and recorded in the following Table IV. This testing procedure is described in further detail in "Industrial and Engineering Chemistry," 43, page 456 (1951) and "Industrial and Engineering Chemistry," 45, pages 392 (1953).

TABLE IV

| | Compound | Hours to absorb 1.0% oxygen at 90° C. |
|---|---|---|
| Example: | | |
| 24 | Control [1] | 502 |
| 25 | MHD | 621 |
| 26 | MPD | 568 |
| 27 | 50/50 MHD/MPD | 570 |

[1] Commercial mixture of substituted diaryl-para-phenylene-diamines.

The above data exemplifies the performance of an age resister system of the present invention (Example 27) as an antioxidant.

While certain representative embodiments and details have been shown for the purpose of illustrating the invention it will be apparent to those skilled in this art that various changes and modifications may be made therein without departing from the spirit or scope of the invention.

What I claim is:

1. A mixture consisting essentially of (a) N-4-methyl-2-pentyl-N'-phenyl-para-phenylenediamine and (b) N-5-methyl-2-hexyl-N'-phenyl-para-phenylenediamine wherein (a) and (b) are present in a weight ratio of (a) to (b) of from about 15/85 to about 65/35.

2. The mixture of claim 1 wherein the ratio of component (a) to component (b) is from about 45/55 to about 15/85.

3. The mixture of claim 1 wherein the ratio of component (a) to component (b) is from about 35/65 to about 15/85.

4. The mixture of claim 1 wherein the ratio of component (a) to component (b) is about 45/50 to about 55/45.

References Cited

UNITED STATES PATENTS

| 3,000,852 | 9/1961 | Merz | 260—576 |
| 3,209,030 | 9/1965 | Bicek | 260—576 |
| 3,366,684 | 1/1968 | Budd | 252—430 |
| 3,418,373 | 12/1968 | Summers et al. | 260—576 |
| 3,496,230 | 2/1970 | Kaplan | 260—576 |

FOREIGN PATENTS

| 1,035,262 | 6/1966 | Great Britain. |

LEON D. ROSDOL, Primary Examiner

IRWIN GLUCK, Assistant Examiner

U.S. Cl. X.R.

252—182, 426; 260—576